(No Model.)

C. A. RAGGIO.
FAUCET AND RACKING VALVE.

No. 283,021. Patented Aug. 14, 1883.

Witnesses:
J. Everett Brown
C. C. Linthicum

Inventor:
Charles A. Raggio,
per Banning & Banning,
his Attorneys.

UNITED STATES PATENT OFFICE.

CHARLES A. RAGGIO, OF CHICAGO, ILLINOIS.

FAUCET AND RACKING-VALVE.

SPECIFICATION forming part of Letters Patent No. 283,021, dated August 14, 1883.

Application filed January 2, 1883. (No model.)

*To all whom it may concern:*

Be it known that I, CHARLES A. RAGGIO, of Chicago, Illinois, have invented certain new and useful Improvements in Faucets and Racking-Valves, of which the following is a specification.

My improvement relates to that class of faucets and valves used for racking and drawing off beer or other liquids from large casks or vats into smaller vessels, and has for its object to provide a simple, convenient, and economical device for such purpose.

Figure 1:
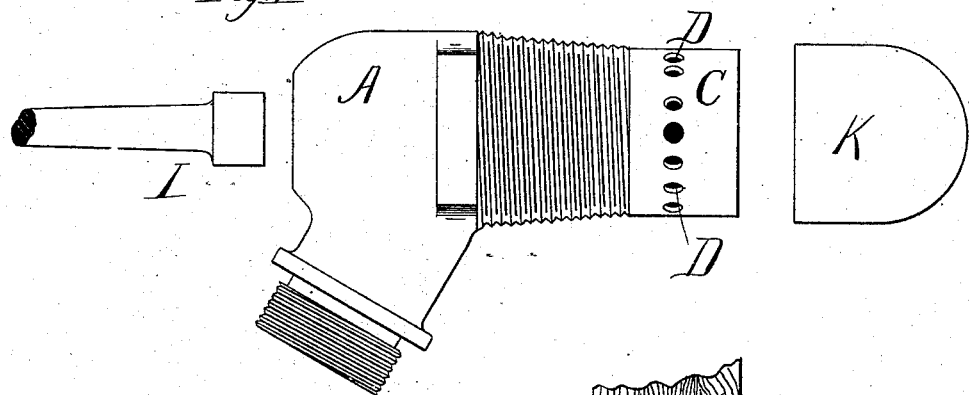
Figure 2:
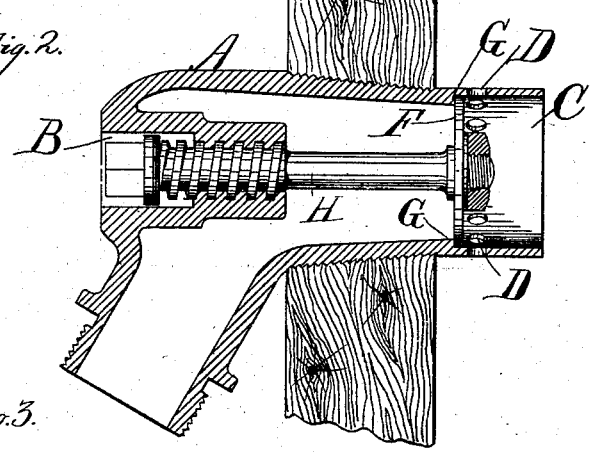
Figure 3:
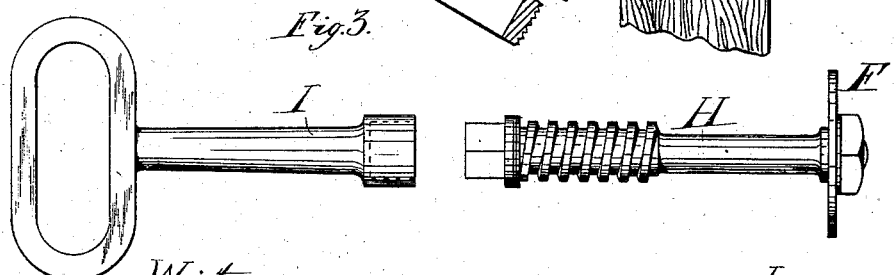

Figure 1 of the drawings shows the device entire. Fig. 2 is a longitudinal sectional view of the same; and Fig. 3, a detached view of the valve, valve-stem, and key.

In the drawings, A is the faucet proper; B, the chamber or shell in the front portion of the faucet A; C, the perforated portion which protrudes into the cask and contains the valve and valve-seat; D, the perforations in the portion C; F, the valve; G, the valve-seat, and H the valve-stem; I, the key for turning the valve-stem, and K the cap.

In constructing my improved faucet and racking-valve, the faucet is cast with a hollow perforated portion at its rear end, which extends through the bung-hole into the cask, and contains the valve F and its seat G. This perforated portion is designed to operate as a strainer when the liquid is being drawn off, to prevent shavings or other substances from entering and clogging the valve. The faucet is cast with a chamber or recess in its front end, which chamber contains the end of the valve-stem hereinafter described. Such chamber terminates in a shoulder, against which the packing of the valve-stem rests when the valve is open. The portion of the faucet just behind this chamber is threaded internally to receive the threaded portion of the valve-stem H. To the rear end of the valve-stem H is fitted a valve, F, which, when resting on its seat G, closes the faucet and prevents the flow of the liquid. A portion of the valve-stem H is threaded so as to fit the correspondingly-threaded portion of the faucet A, and the end of such valve-stem is adapted to receive the key I. When the valve-stem is turned by means of the key, the valve is caused to leave its seat and travel backward past the perforations D, thus allowing the liquid to flow through such perforations and escape through the faucet. The valve is provided with suitable packing to prevent the escape of the liquid when the valve is closed, and the front end of the valve-stem is also provided with suitable packing to prevent the escape of the liquid around the valve-stem when the valve is open. The portion of the faucet which is fitted to the bung-hole may be threaded externally, so as to form a bushing, or may be left smooth, as desired. To prevent the pitch from filling the perforations or clogging the valve when the vessel is being pitched, I provide a cap, K, which may be placed over the perforated portion by inserting the arm through the man-hole of the cask. This cap may be simply slipped on, or may be provided with threads at its end, which engage with threads on the end of the faucet. The end of the perforated shell may be formed by a nut, which, when taken off, allows the valve to be removed.

I am aware that similar devices for operating the valve as those above described have been before employed, and I do not therefore claim them, broadly; but

I claim—

1. The combination of the faucet A, provided with the perforated portion C, with the valve F, valve-stem H, and key I, substantially as described.

2. The combination of the faucet A, provided with the perforated portion C, with the cap K, substantially as described.

CHARLES A. RAGGIO.

Witnesses:
THOMAS A. BANNING,
CHARLES C. LINTHICUM.